(12) United States Patent
Kiryu

(10) Patent No.: US 6,284,398 B1
(45) Date of Patent: Sep. 4, 2001

(54) REFORMER FOR A FUEL CELL

(76) Inventor: Koji Kiryu, 3-12-5, Kiyosu, Kiyosu-cho, Nishikasugai-gun, Aichi-ken (JP)

( * ) Notice: Subject to any disclaimer, the term of this patent is extended or adjusted under 35 U.S.C. 154(b) by 0 days.

(21) Appl. No.: 09/185,504

(22) Filed: Nov. 4, 1998

(30) Foreign Application Priority Data

Nov. 4, 1997 (JP) ................................................. 9-319041

(51) Int. Cl.[7] ............................... H01M 8/06; B01J 8/02
(52) U.S. Cl. ......................... 429/19; 422/211; 422/218; 422/236
(58) Field of Search ............................. 429/19; 422/211, 422/218, 236

(56) References Cited

U.S. PATENT DOCUMENTS

| | | | |
|---|---|---|---|
| 2,634,194 | * | 4/1953 | Nebeck . |
| 2,884,372 | * | 4/1959 | Bergstrom . |
| 4,814,147 | * | 3/1989 | Flork ................................ 422/211 X |
| 5,565,178 | * | 10/1996 | Dove et al. ...................... 422/218 X |
| 5,762,658 | | 6/1998 | Edwards et al. . |

* cited by examiner

Primary Examiner—Stephen Kalafut
(74) Attorney, Agent, or Firm—Oblon, Spivak, McClelland, Maier & Neustadt, P.C.

(57) ABSTRACT

A reformer for a fuel cell is structured so that the entirety of a catalytic layer is effectively used, a sufficient shift reaction is made possible, the volume velocity is raised, and the pressure loss is reduced. The reformer includes a container having an inlet for introduction of a vapor of a methanol solution as a raw fuel, an outlet for discharge of a reformed gas and a catalytic layer in the container. It is structured such that the inside of the container is divided into an inlet space communicating with the inlet and an outlet space communicating with the outlet. A passage cross section of the catalytic layer at a side of the outlet space is larger than a passage cross section at a side of the inlet space, preferably by 20% to 250%.

9 Claims, 6 Drawing Sheets

REFORMER FOR A FUEL CELL

BACKGROUND OF THE INVENTION

1. Field of the Invention

The present invention relates to a reformer for a fuel cell using a partial oxidation reaction (also called autothermal) as a reforming reaction, and more particularly to a reformer for a fuel cell comprising a container provided with an inlet for introduction of a vapor of a methanol solution as a raw fuel and an outlet for discharge of a reformed gas, and a catalytic layer which divides the inside of the container into an inlet space communicating with the inlet and an outlet space communicating with the outlet end which is constructed such that a passing cross section of the catalytic layer at the side of the outlet space becomes larger than a passing cross section at the side of the inlet space.

2. Description of the Related Art

Although a reformer is often used for a conventional hydrogen supply apparatus to a fuel cell, for improvement of starting properties, responsiveness, and miniaturization, a reforming reaction using a partial oxidation method is effective in a conventional hydrogen generating apparatus as disclosed in Japanese Patent Unexamined Publication No. Hei. 8-231201.

In reforming by a partial oxidation reaction, a reaction in which excess water is added is generally used, and reaction proceeds according to the following equations, in which equation 1 indicates a partial oxidation reaction, equation 2 indicates a methanol decomposition reaction, and equation 3 indicates a shift reaction.

$$CH_3OH + 0.5O_2 \rightarrow CO_2 + 2H_2 - 192 KJ \text{ (kilojoules)} \quad [\text{Equation 1}]$$

$$CH_3OH \rightarrow CO_2 + 2H_2 + 91 KJ \quad [\text{Equation 2}]$$

$$CO + H_2O \rightarrow CO_2 + H_2 - 41 KJ \quad [\text{Equation 3}]$$

In an actual reforming unit, the partial oxidation reaction of methanol occurs, and the decomposition reaction of methanol progresses by heat generation in the former reaction, and the shift reaction occurs by CO obtained in the former reaction and excess water. In this case, while the partial oxidation reaction and the methanol decomposition reaction progress at a relatively high temperature of 300 to 400° C., the shift reaction progresses at a relatively low temperature of, for example, 150 to 250° C. so as to lower the unreacted CO concentration, and the reaction rate of the shift reaction is low as compared with the partial oxidation reaction and the methanol decomposition reaction. Thus the shift reaction determines the rate of the total reaction.

However, as the foregoing three kinds of reactions progress, the mole number of the reaction products at the right side of the above equations becomes larger than the mole number at the left side. Thus, the volume of the product gas increases, which causes the flow velocity to increase. That is, there is a problem that the flow velocity is increased in the region where the third shift reaction occurs, so that a sufficient shift reaction cannot be performed.

In a reforming unit using a partial oxidation reaction, heat supply from the outside is unnecessary, and for example, in the conventional hydrogen generating apparatus (Japanese Patent Unexamined Publication No. Hei. 8-231201), there is proposed a structure as shown in FIG. 10, in which a raw fuel is directly blown into a reforming unit K.

In the paper "REFORMERS FOR THE PRODUCTION OF HYDROGEN FROM METHANOL AND ALTERNATIVE FUELS FOR FUEL CELL POWERED VEHICLE" published August 1992 by Argonne National Laboratory Co. Ltd., as shown in FIG. 11, the JPL autothermal reformer is constructed such that a raw fuel gas, air, and water vapor are mixed by a swirl mixer SM, and are supplied in an axial direction of a cylindrical reforming unit in which a low temperature active catalytic layer L, an oxidation catalytic layer O, and a water vapor reforming catalytic layer H are arranged in sequence along the length of the reforming unit, so that the fed raw fuel gas is reformed.

In the above hydrogen generating apparatus, it is difficult to supply a raw fuel uniformly to the catalytic layers within the reforming unit, and so to effectively use the entirety of the catalytic layers, so that a sufficient shift reaction cannot be performed. Further, it is difficult to raise the volume velocity.

In the foregoing reformer, since the passage length of the cylindrical reforming unit through which a raw fuel gas passes is large, if a volume velocity, that is, a reaction gas flow amount per unit volume of a catalyst, which is an index of catalyst efficiency, is to be raised, the flow velocity becomes high and the pressure loss rises, so that the raw fuel must be introduced at a high pressure and high power consumption results.

Moreover, in order for the shift reaction to be sufficiently performed, the volume of the water vapor reaching the reforming catalytic layer for performing water vapor reforming reaction in FIG. 11 is required to be large, so that the pressure loss is further increased and the volume velocity is lowered.

SUMMARY OF THE INVENTION

It is an object of the present invention to enable a sufficient shift reaction by effectively using the entirety of the catalytic layer in the reformer.

It is a further object of the present invention to enable a sufficient shift reaction by raising the volume velocity in the reformer.

It is yet a further object of the present invention to enable a sufficient shift reaction by lowering the pressure loss in the reformer.

According to the present invention, the above and other objects are achieved in a reformer for a fuel cell using a partial oxidation reaction (also called autothermal) as a reforming reaction, where the inside of a container is divided by the catalytic layer into an inlet space communicating with the inlet for introduction of a vapor of a methanol solution as a raw fuel and an outlet space communicating with the outlet for discharge of the reformed gas, and a passage cross section of the catalytic layer at the side of the outlet space is larger than a passage cross section at the side of the inlet space.

According to a first aspect of the present invention, a reformer for a fuel cell using a partial oxidation reaction as a reforming reaction comprises a container including an inlet for introduction of a vapor of a methanol solution as a raw fuel and an outlet for discharge of a reformed gas, and a catalytic layer structured such that the inside of the container is divided into an inlet space communicating with the inlet and an outlet space communicating with the outlet, in which a passage cross section of the catalytic layer at a side of the outlet space is larger than a passage cross section at a side of the inlet space.

According to a second aspect of the present invention in the first aspect, the passage cross section of the catalytic layer at the side of the outlet space is larger by a range of 20% to 250% than the passing cross section at the side of the inlet space.

According to a third aspect of the present invention in the first aspect, the passage cross section of the catalytic layer becomes gradually larger from the side of the inlet space to the side of the outlet space.

According to the fourth aspect of the present invention in the first aspect, the catalytic layer is made of a porous material hydrocarbon catalyst, such as ceramics including alumina supporting a methanol reforming catalyst.

According to a fifth aspect of the present invention in the first aspect, the catalytic layer is made up of a small diameter cylindrical wire mesh, a large diameter cylindrical wire mesh coaxially disposed with the small diameter wire mesh, and a granular catalyst disposed between the small diameter wire mesh and the large diameter wire mesh.

According to a sixth aspect of the present invention in the first aspect, the container is a hollow cylindrical container in which an opening is formed at a center of one axial end of the container and an opening is formed at a center of the other axial end, the catalytic layer is formed of a hollow cylinder with a smaller outer diameter and a shorter length in an axial direction than those of the container, one axial end of the catalyst layer is fixed to the one axial end of the container in which the one opening constituting the inlet is formed, and a plate is provided for closing a center opening of the other axial end of the catalyst layer.

According to a seventh aspect of the present invention in the first aspect, the container is a hollow cylindrical container in which an opening is formed at a peripheral portion of one axial end of the container and an opening is formed at a center of the other axial end. The catalytic layer is structured as a plurality of diametric parts of hollow cylinders are provided side by side and at equal angles on an inner peripheral wall of the container. The inlet space is formed between the inner peripheral wall of the container and an inner peripheral wall of each of the parts of the hollow cylinders and the outlet space is formed between outer peripheral walls of the parts of the hollow cylinders.

According to an eighth aspect of the present invention in the first aspect, the container is a hollow truncated cortical container in which an opening is formed at a center of one axial end of the container and an opening is formed at a center of the other axial end, and in which an outer diameter of the container increases gradually, and the catalytic layer is disposed in the truncated conical container between a position separated from the opening constituting the inlet by a fixed distance and a position separated from the opening constituting the outlet by a fixed distance.

According to a ninth aspect of the present invention in the first aspect, the container is a hollow cylindrical container in which an opening is formed at a center of one axial end of the container and an opening is formed at a center of the other axial end. The catalytic layer is disposed inside the container and is formed of a hollow sphere including a small diameter spherical inlet space. The inlet space of the hollow sphere communicates with the opening of the one axial end of the container, and the outlet space is formed between an outer wall of the catalytic layer of the hollow sphere and an inner peripheral wall of the container.

According to a tenth aspect of the present invention in the first aspect, hydrocarbon as the raw fuel is introduced into the container and is reformed.

In the reformer for a fuel cell of the first aspect of the present invention, the vapor of the methanol solution as the raw fuel is introduced into the inlet space of the container through the inlet, the vapor of the methanol solution is subjected to a partial oxidation reaction as a reforming reaction by the catalytic layer structured such that the inside of the container is divided into the inlet space and the outlet space, and the passage cross section of the catalytic layer at the side of the outlet space is larger then the passage cross section at the side of the inlet space, and a reformed gas is discharged outside of the container from the outlet, so that the entirety of the catalytic layer is effectively used and a sufficient shift reaction is made possible.

The reformer for a fuel cell of the second aspect of the present invention is structured such that in the first aspect, the passage cross section of the catalytic layer at the side of the outlet space is made larger by a range of 20% to 250% than the passage cross section at the side of the inlet space, so that even if the volume flow amount of the reformed gas is increased by the increase of the mole number in the reforming reaction, the increase of the flow velocity of the reformed gas is suppressed, and the increase of the pressure loss is suppressed so that the pressure loss is reduced.

The reformer for a fuel cell of the third aspect of the present invention is structured such that in the first aspect, the passage cross section of the catalytic layer becomes gradually larger from the side of the inlet space to the side of the outlet space, so that even if the volume flow amount of the reformed gas is increased by the increase of the mole number in the reforming reaction, the increase of the flow velocity of the reformed gas is uniformly suppressed and the increase of the pressure loss is suppressed so that the pressure loss is reduced.

The reformer for a fuel cell of the fourth aspect of the present invention is structured such that in the first aspect, the catalytic layer is made of a porous material supporting the hydrocarbon reforming catalyst, so that the vapor of the methanol solution passing through the catalytic layer is uniformly reformed by the methanol reforming catalyst supported by the porous material.

The reformer for a fuel cell of the fifth aspect of the present invention is structured such that in the first aspect, the catalytic layer is made of a small diameter cylindrical wire mesh, a large diameter cylindrical wire mesh coaxially disposed with the small diameter wire mesh and a granular catalyst disposed between the small diameter wire mesh and the large diameter wire mesh, so that the vapor of the methanol solution passing through the catalytic layer is uniformly reformed by the granular catalyst.

The reformer for a fuel cell of the sixth aspect of the present invention is structured such that in the first aspect, the vapor of the methanol solution as the raw fuel is introduced through the opening formed at the center of one axial end of the hollow cylindrical container into the inlet space formed inside the catalytic layer of the hollow cylinder which is fixed to the one axial end of the hollow cylindrical container and has a small outer diameter and the short. length in an axial direction. The vapor of the methanol solution is subjected to a partial oxidation reaction as the reforming reaction by the catalytic layer of the hollow cylinder, and the reformed gas is discharged from the opening formed at the center of the other axial end of the container through the outlet space at the outer peripheral side of the catalytic layer of the hollow cylinder and at the outside of the plate disposed at the center opening of the other axial end of the hollow cylinder and closing the opening so that the entirety of the catalytic layer is effectively used, a sufficient shift reaction is made possible, the volume velocity is raised, and the pressure loss is reduced.

The reformer for a fuel cell of the seventh aspect of the present invention is structured such that in the first aspect, the vapor of the methanol solution as the raw fuel is introduced through the opening formed at the peripheral portion of the one axial end of the hollow cylindrical container into the inlet space formed between the inner peripheral wall of the container and each of the catalytic layers made of the diametric parts of hollow cylinders, and which are provided side by side and at equal angles on the inner peripheral wall of the container. The introduced vapor of the methanol solution is subjected to a partial oxidation reaction as a reforming reaction by the catalytic layers, and the reformed gas is discharged from the opening formed at the center of the other axial end of the container through the outlet space formed between the outer peripheral walls of the respective catalytic layers, so that the entirety of the catalytic layer is effectively used, a sufficient shift reaction is made possible, the volume velocity is raised and the pressure loss is reduced.

The reformer for a fuel cell of the eighth aspect of the present invention is structured such that in the first aspect, the vapor of the methanol solution as the raw fuel is introduced through the opening formed at the center of one axial end of the hollow truncated conical container with a gradually increasing outer diameter into the inlet space formed between the opening and the catalytic layer disposed at a position separate from the opening by a fixed distance. The introduced vapor of the methanol solution is subjected to a partial oxidation reaction as the reforming reaction by the truncated conical catalytic layer, and the reformed gas is discharged from the opening formed at the center of the other axial end of the container through the outlet space formed between the catalytic layer and the other axial end of the container, so that the entirety of the catalytic layer is effectively used, a sufficient shift reaction is made possible, the volume velocity is raised and the pressure loss is reduced.

The reformer for a fuel cell of the ninth aspect of the present invention is structured such that in the first aspect, the vapor of the methanol solution as the raw fuel is introduced through the opening formed at the center of one axial end of the hollow cylindrical container into the spherical inlet space with a small diameter formed inside the catalytic layer of the hollow sphere, the introduced vapor of the methanol solution is subjected to a partial oxidation reaction as the reforming reaction by the catalytic layer of the hollow sphere, and the reformed gas is discharged from the opening formed at the center of the other axial end of the container through the outlet space formed between the catalytic layer and the inner peripheral wall of the container, so that the entirety of the catalytic layer is effectively used, a sufficient shift reaction is made possible, the volume velocity is raised, and the pressure loss is reduced.

The reformer for a fuel cell of the tenth aspect of the present invention is structured such that in the first aspect, hydrocarbon as the raw fuel is introduced into the container and is reformed by the catalytic layer, so that even if the volume flow amount of the reformed gas is increased by the increase of the mole number in the reforming reaction, the increase of the flow velocity of the reformed gas is uniformly suppressed and the increase of the pressure loss is suppressed.

DESCRIPTION OF THE PREFERRED EMBODIMENTS

Preferred embodiments of the present invention will be described below with reference to the drawings.

(First Embodiment)

Figure 1:
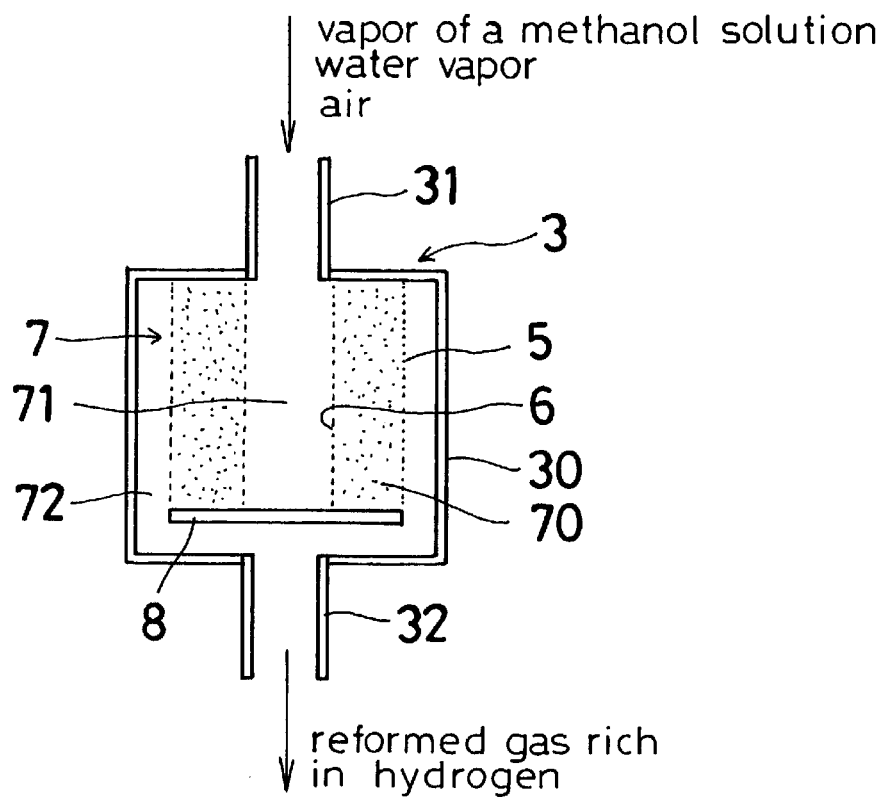
FIG. 1 is a sectional view showing a reformer for a fuel cell of a first embodiment of the present invention.
Figure 2:
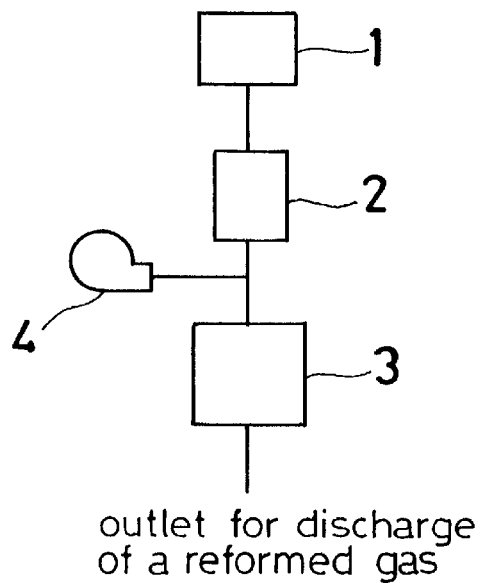
FIG. 2 is a block diagram showing the entirety of the reformer for a fuel cell of the first embodiment.
Figure 3:
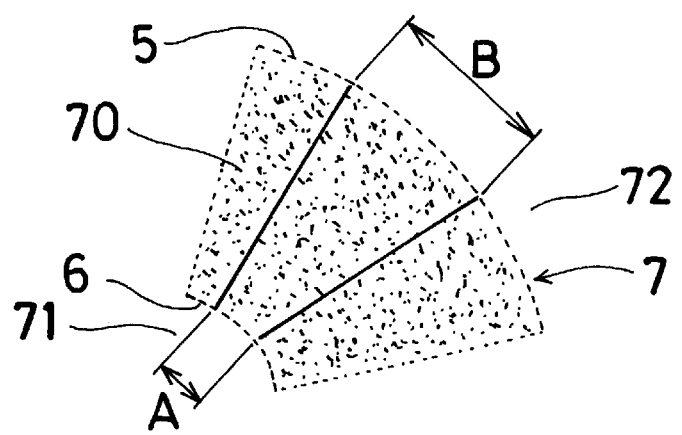
FIG. 3 is a partial enlarged sectional view showing a catalytic layer in the first embodiment.

As shown in FIGS. 1 to 3, a reformer for a fuel cell of a first embodiment includes a hollow cylindrical container 30 having an opening which is formed at a center of one axial end of the container and functions as an inlet 31 for introduction of a vapor of a methanol solution as a raw fuel, and an opening which is formed at a center of the other axial end and functions as an outlet 32 for discharge of a reformed gas. A catalytic layer 7 made as a hollow cylinder 70 having a smaller outer diameter and a shorter length in an axial direction than those of the container is positioned coaxially within the hollow cylindrical container 30. The catalytic layer is structured such that one axial end of the hollow cylinder is fixed to the one axial end of the container 30. A plate 8 is disposed to close a center opening at the downstream axial end of the hollow cylinder. A partial oxidation reaction as a reforming reaction takes place in the catalytic layer. An inlet space 71, which may be cylindrical, is formed within the hollow of the hollow cylindrical catalytic layer and communicates with the inlet, and an annular outlet space 72 is formed outside of the catalytic layer of the hollow cylinder and communicates with the outlet.

The raw fuel gas to be reformed enters the container 30 via the inlet 31 to reach the inlet space 71. From there it passes through the catalytic layer 7, to be reformed, and reaches the annular outlet space 72. Since the inlet space is positioned radially inside of the catalytic layer 7 and the outlet space is positioned radially outside of the catalytic layer 7, the gas passage cross section of the catalytic layer at the side of the outlet space is larger than the gas passage cross section at the side of the inlet space.

As shown in FIG. 2, the reformer for a fuel cell of the first embodiment includes a methanol solution tank 1 for storing the methanol solution as the raw fuel, a vaporizer 2 for vaporizing the methanol solution supplied from the methanol solution tank 1, and a blower 4 for mixing air to the methanol vapor and water vapor supplied from the vaporizer 2 and for supplying the mixture to a reforming unit 3.

As shown in FIG. 1, in the hollow cylindrical container 30, an opening is formed at the center of the one axial end of the container, and a small diameter pipe forming the inlet 31 for introduction of the vapor of the methanol solution as a raw fuel is coaxially disposed with the opening. Moreover, another opening is formed at the center of the other axial end of the container and a small diameter pipe forming the outlet 32 for discharge of the reformed gas is coaxially disposed with the other opening.

Referring to FIG. 1, the catalytic layer 7 is formed from a cylindrical wire mesh 6 with a small diameter, a cylindrical wire mesh 5 with a large diameter disposed coaxially around the cylindrical wire mesh 6 with a small diameter, and granular catalyst disposed between them. A partial oxidation reaction is performed as the reforming reaction.

The hollow cylinder 70 has a smaller outer diameter and a shorter length in an axial direction than the container 30. One axial end of the hollow cylinder 70 is fixed to one axial end of the container and the plate 8 is disposed to close the center opening of the other axial end of the hollow cylinder.

As shown in FIG. 3, the gas passage cross section of the catalytic layer 7 at the side of the outlet space is larger than a passage cross section at the side of the inlet space by a range of 20% to 250%. Since the gas flows generally radially through the catalytic layer 7, this increased passage cross section is exemplified by the divergence from spacing A to spacing B of the radial lines shown in this figure. Since the catalytic layer 7 is formed in a hollow cylinder 70, as shown in FIG. 3, the passage cross section increases gradually from the inlet space side to the outlet space side.

In the reformer for a fuel cell of the first embodiment having the above structure, the vapor of the methanol solution is sent from the methanol solution tank 1 (FIG. 2) to the vaporizer 2, and the methanol vapor vaporized into a gas and water vapor are sent to the reforming unit 3. At that time, air for the reforming reaction is supplied from the blower 4 into the vaporized methanol vapor and the water vapor from the vaporizer 2. Thereafter, the supplied methanol vapor, water vapor, and air are reformed by the reforming unit 3, and discharged from the outlet 32 as a gas rich in hydrogen.

Within the reforming unit 3, the methanol vapor as the raw fuel, water vapor, and air are introduced through the raw fuel inlet 31 and reach the granular catalytic layer 7 via the inlet space and the catalyst holding mesh 6, so that a reforming reaction is started. Thereafter, the raw fuel reformed by the catalytic layer 7 passes as a reformed gas through the catalyst holding mesh 5 and is discharged via the outlet space 72 from the reformed gas outlet 32.

In the above reforming process, raw fuel having passed through a portion A of the catalyst holding mesh 6 (FIG. 3) is reformed within the catalytic layer 7 a cross section which gradually increases. Generally, in a reforming reaction, the total mole number of produced materials is larger than the total mole number of raw fuel materials in a vapor state, and so the volume flow amount of the produced materials is larger than that of the raw fuel materials. If, as in the conventional apparatus, the passage cross section of the catalytic layer is constant, the flow velocity becomes high so that the pressure loss is increased. Especially in the shift reaction in which the reaction is comparatively slow, if the flow velocity is increased in order to produce a sufficient reaction, the thickness of the catalytic layer in the passage direction must be increased, which further increases the pressure loss, and more power for introducing the raw fuel becomes necessary so that the total efficiency is lowered.

However, in the first embodiment, as shown in FIG. 3, since the passage cross section of the catalytic layer 7 is gradually increased, the increase of the flow velocity can be suppressed, and the increase of the pressure loss can be suppressed. In this way, the reformed gas produced by the reforming reaction in the catalytic layer 7 passes through the catalyst holding mesh 5 and is discharged through the outlet space 72 from the gas discharge outlet 32.

In the reformer for a fuel cell of the first embodiment having the above operation, the vapor of the methanol solution as the raw fuel is subjected to a partial oxidation reaction and water vapor reactions as the reforming reaction by the catalytic layer 7. The passage cross section at the side of the outlet space is larger than the passage cross section at the side of the inlet space and the reformed gas is discharged outside of the container 30 from the outlet 32, so that the entirety of the catalytic layer 7 is effectively used and a sufficient shift reaction is made possible.

Moreover, in the reformer for a fuel cell of the first embodiment, the passage cross section of the catalytic layer 7 at the side of the outlet space is larger by a range of 20% to 250% than the passage cross section at the side of the inlet space, so that even if the volume flow amount of the reformed gas is increased by an increased mole number in the reforming reaction, the increase of the flow velocity of the reformed gas is suppressed and the increase of a pressure loss is suppressed, so that the pressure loss is reduced. Moreover, in the reformer for a fuel cell of the first embodiment, the catalytic layer 7 is a hollow cylinder and the passage cross section of the catalytic layer becomes gradually larger from the side of the inlet space 71 to the side of the outlet space 72, so that even if the volume flow amount of the reformed gas is increased by the increase of the mole number in the reforming reaction, the increase of the flow velocity of the reformed gas is uniformly suppressed and the increase of a pressure loss is suppressed, so that the pressure loss is reduced.

Moreover, in the reformer for a fuel cell of the first embodiment, the catalytic layer 7 is made up of the small diameter cylindrical wire mesh 6, the large diameter cylindrical wire mesh 5 coaxially disposed with the small diameter wire mesh, and the granular catalyst disposed between the small diameter cylindrical wire mesh 6 and the large diameter cylindrical wire mesh 5, so that the vapor of the methanol solution passage through the catalytic layer is uniformly reformed by the granular catalyst.

Moreover, in the reformer for a fuel cell of the first embodiment, the vapor of the methanol solution is subjected to a partial oxidation reaction and the water vapor reforming reaction as the reforming reaction by the catalytic layer 7 of the hollow cylinder 70, and the reformed gas is discharged from the outlet 32 formed at the center of the other axial end of the container 30 through the outlet space 72 at the outer peripheral side of the catalytic layer 7 and outside of the plate 8 disposed at the center opening of the downstream axial end of the hollow cylinder and closing the opening, so that the entirety of the catalytic layer 7 is effectively used, a sufficient shift reaction is made possible, the volume velocity is raised and the pressure loss is reduced.

(Second Embodiment)

Figure 4:
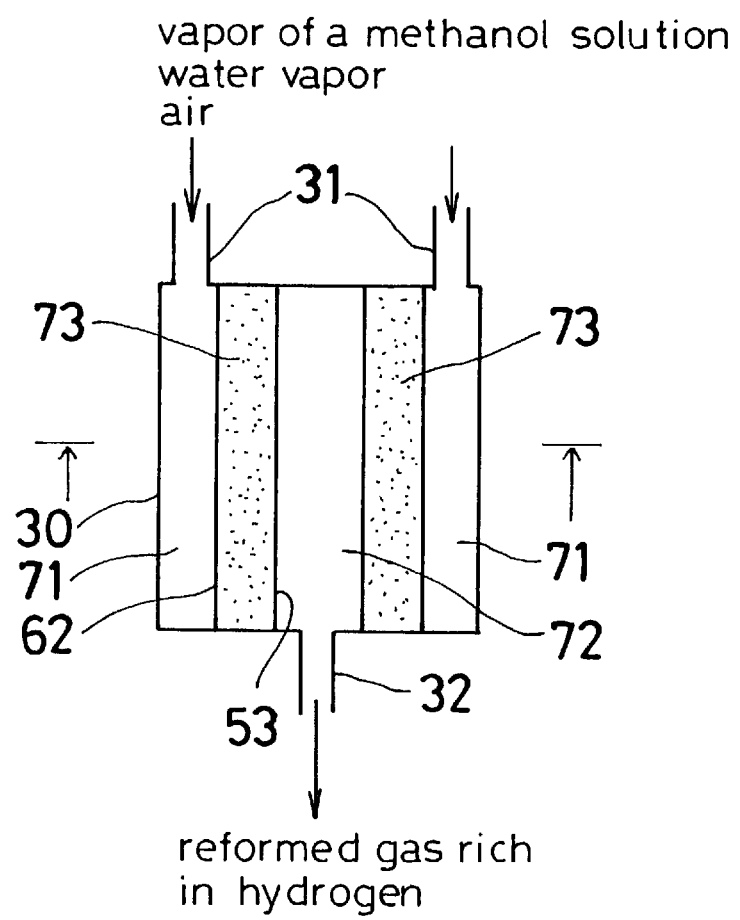
FIG. 4 is a sectional view showing a reformer for a fuel cell of a second embodiment of the present invention.
Figure 5:
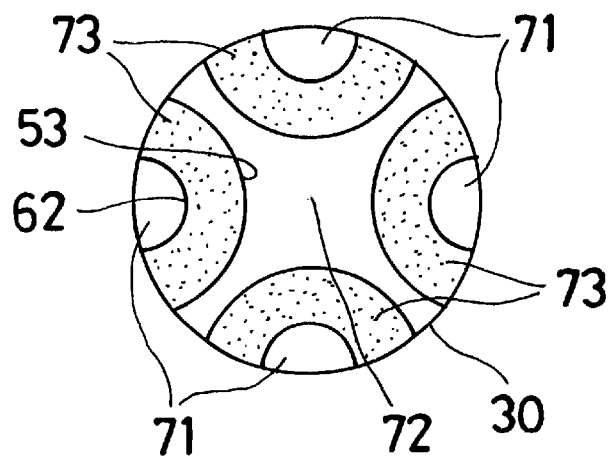
FIG. 5 is a sectional view showing the cross section of a container of the second embodiment.

As shown in FIGS. 4 and 5, a reformer for a fuel cell of a second embodiment is different from the first embodiment in that a plurality of catalytic layers 73 are disposed in a container 30, inlet spaces 71 are formed between the container 30 and the plurality of catalytic layers 73, and an outlet space 72 is formed outside of the plurality of catalytic layers 73.

In the reformer for a fuel cell of the second embodiment, the container 30 is formed as a hollow cylindrical container having a plurality of inlets 31 at the periphery of one axial end of the container end an outlet 32 formed at a center of the other axial end. The catalytic layer is made up of a plurality of diametric sections or parts 73 of hollow cylinders which are provided side by side on the inner peripheral wall of the container 30 at equal angles.

For each of the parts of the hollow cylinders making up the respective catalytic layers 73, a cylindrical wire mesh 62 with a small diameter and a cylindrical wire mesh 53 with a large diameter are coaxially disposed, and a granular catalyst is disposed between them to form the hollow cylinder. A partial oxidation reaction and a water vapor reforming reaction are performed as the reforming reaction.

In the reformer for a fuel cell of the second embodiment having the above structure, the vapor of the methanol solution as the raw fuel and air are introduced from the plurality of inlets 31 formed at the peripheral portion of the one axial end of the hollow cylindrical container 30 into the inlet spaces 71 formed between the inner peripheral wall of the container and of the plurality of catalytic layers 73. The vapor of the methanol solution and air introduced through the catalytic layers 73 is subjected to partial oxidation reaction as the reforming reaction. The resulting reformed gas is discharged from the outlet 32 formed at the center of the other axial end of the container 30 through the outlet space 72 formed between the outer peripheral walls of the respective catalytic layers 73.

In the reformer for a fuel cell of the second embodiment having the above operation, the passage cross section of the catalytic layer at the exit side is larger than the passage cross section at the entrance side, so that the entirety of the catalytic layer 73 is effectively used, a sufficient shift reaction is made possible, the volume velocity is raised, and the pressure loss is reduced even if the volume of the reformed gas is increased by an increase of the mole number during the reforming reaction.

(Third Embodiment)

Figure 6:
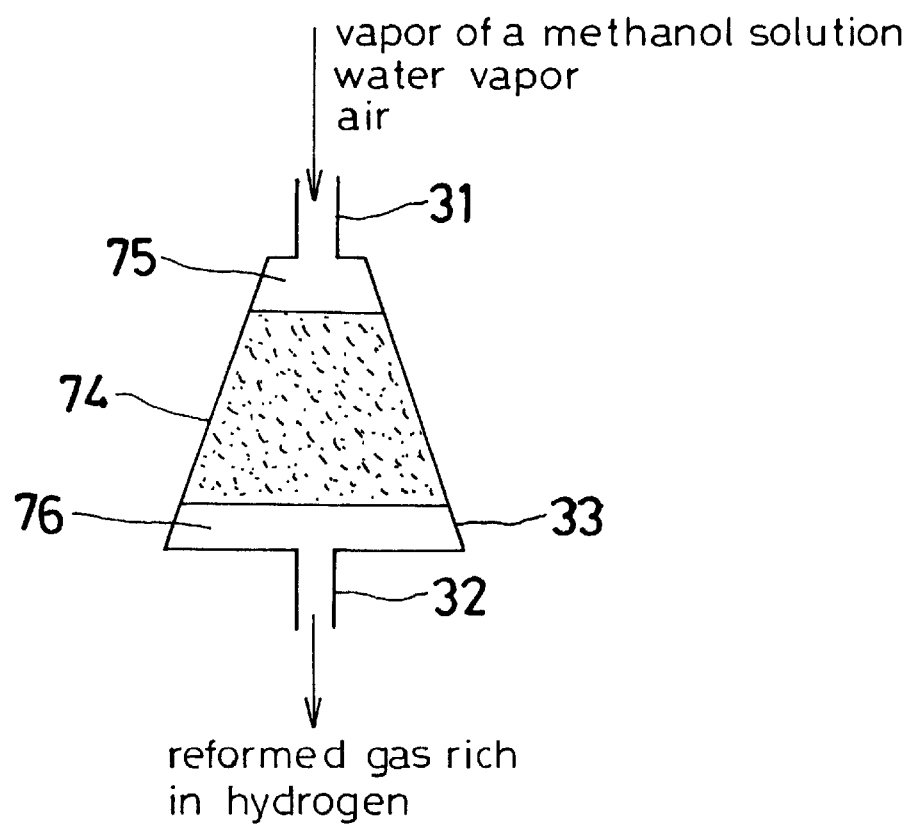
FIG. 6 is a sectional view showing a reformer for a fuel cell of a third embodiment of the present invention.
Figure 7:
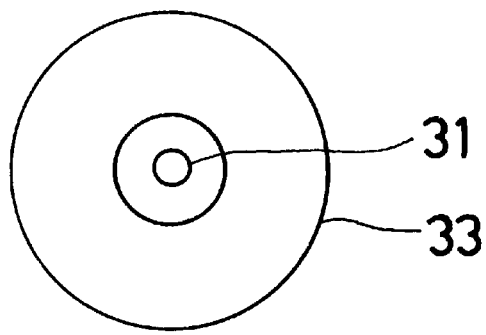
FIG. 7 is a plan view showing a container of the third embodiment.

A reformer for a fuel cell of a third embodiment is different from the first embodiment in that, as shown in FIGS. 6 and 7, a catalytic layer 74 is disposed at a center of a hollow truncated conical container 33 having vertically spaced inlet and outlet spaces. The container 33 is a hollow truncated conical container in which an inlet 31 is formed at a center of one axial end of the container and an outlet 32 is formed at a center of the other axial end, and the outer diameter of which is gradually increased.

For the catalytic layer 74, circular wire meshes as catalyst holding meshes are respectively disposed in the truncated conical container 33 at a position separate from the opening constituting the inlet 31 by a constant distance and at a position separate from the opening constituting the outlet 32 by a constant distance, and a granular catalyst is interposed between the meshes. A first space 75 is formed between the one axial end of the truncated conical container 33 at the side of the inlet 31 and the upper end of the truncated conical catalytic layer 74, and a second space 76 is formed between the other axial end of the truncated conical container 33 and the lower end of the truncated conical catalytic layer 74.

In the reformer for a fuel cell of the third embodiment having the above structure, the vapor of the methanol solution as the raw fuel and air are introduced from the inlet 31 into the inlet space 75 formed between the inlet 31 and the upper end of the catalytic layer 74. The introduced vapor of the methanol solution and air are subjected to a partial oxidation reaction as the reforming reaction in the truncated conical catalytic layer 74, and the reformed gas is discharged through the outlet space 76 formed between the catalytic layer 74 and the other axial end of the container 33.

In the reformer for a fuel cell of the third embodiment having the above operation, since the introduced vapor of the methanol solution and air are subjected to a partial oxidation reaction as the reforming reaction by the truncated conical catalytic layer 74 with a gradually increasing passage cross section, the entirety of the catalytic layer is effectively used, a sufficient shift reaction is made possible, the volume velocity is raised, and the pressure loss is reduced.

Since the reformer for a fuel cell of the third embodiment having the above operation is formed as a simple structure in which the catalytic layer 74 is disposed at the center of the hollow truncated conical container 33 to provide the spaces 75 and 76, the cost is reduced and maintenance becomes easy.

(Fourth Embodiment)

Figure 8:
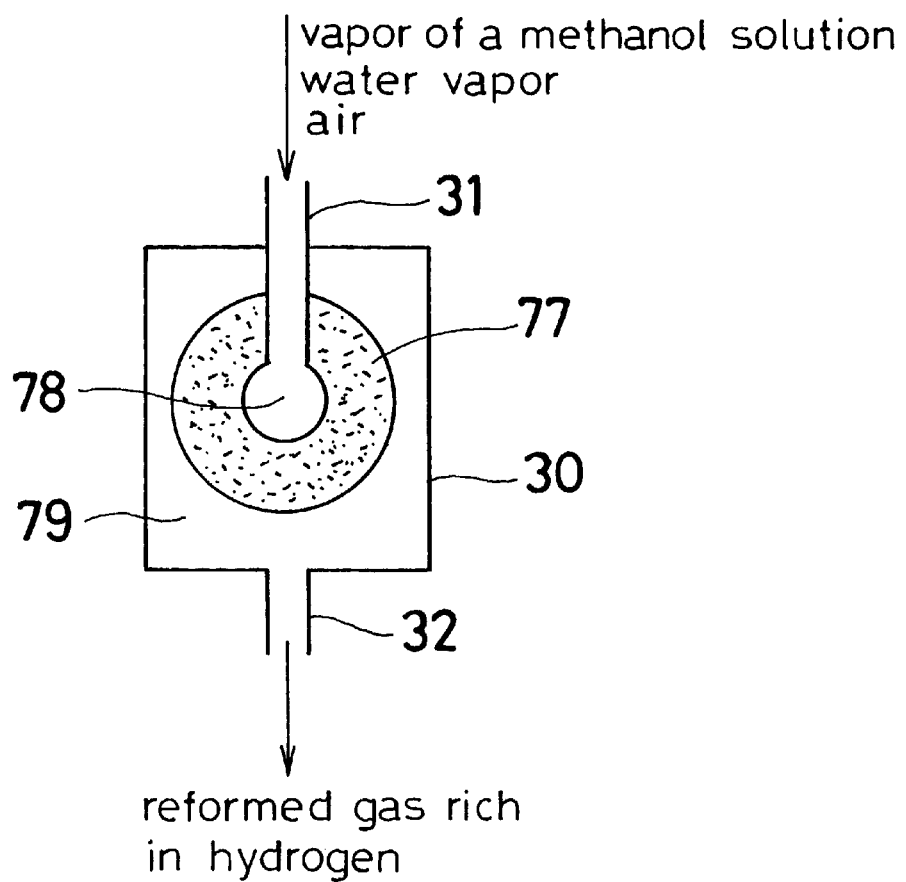
FIG. 8 is a sectional view showing a reformer for a fuel cell of a fourth embodiment of the present invention.
Figure 9:
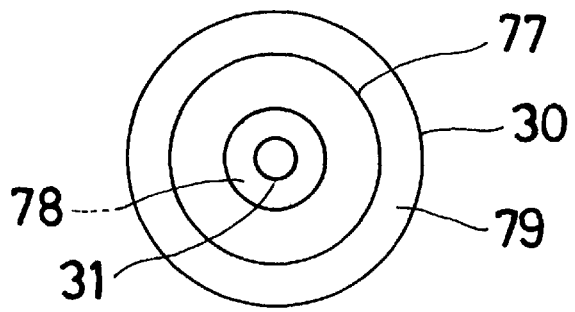
FIG. 9 is a plan view showing a container of the fourth embodiment.
Figure 11:
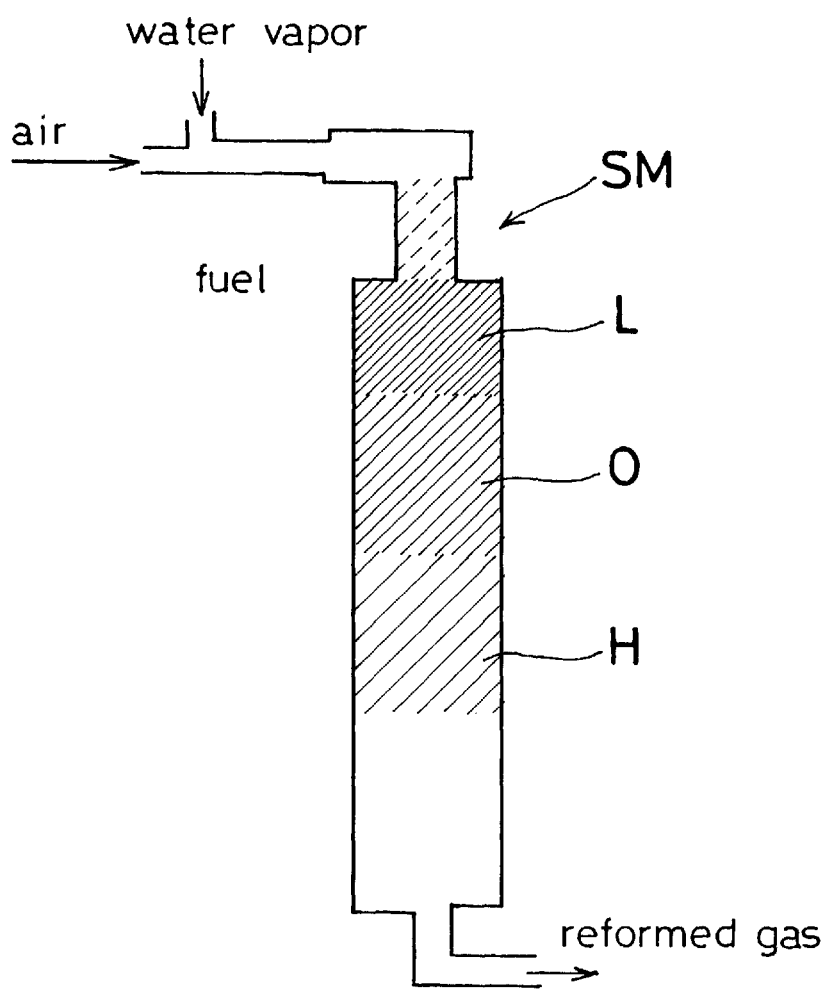
FIG. 11 is a sectional view showing a conventional reformer.
Figure 10:
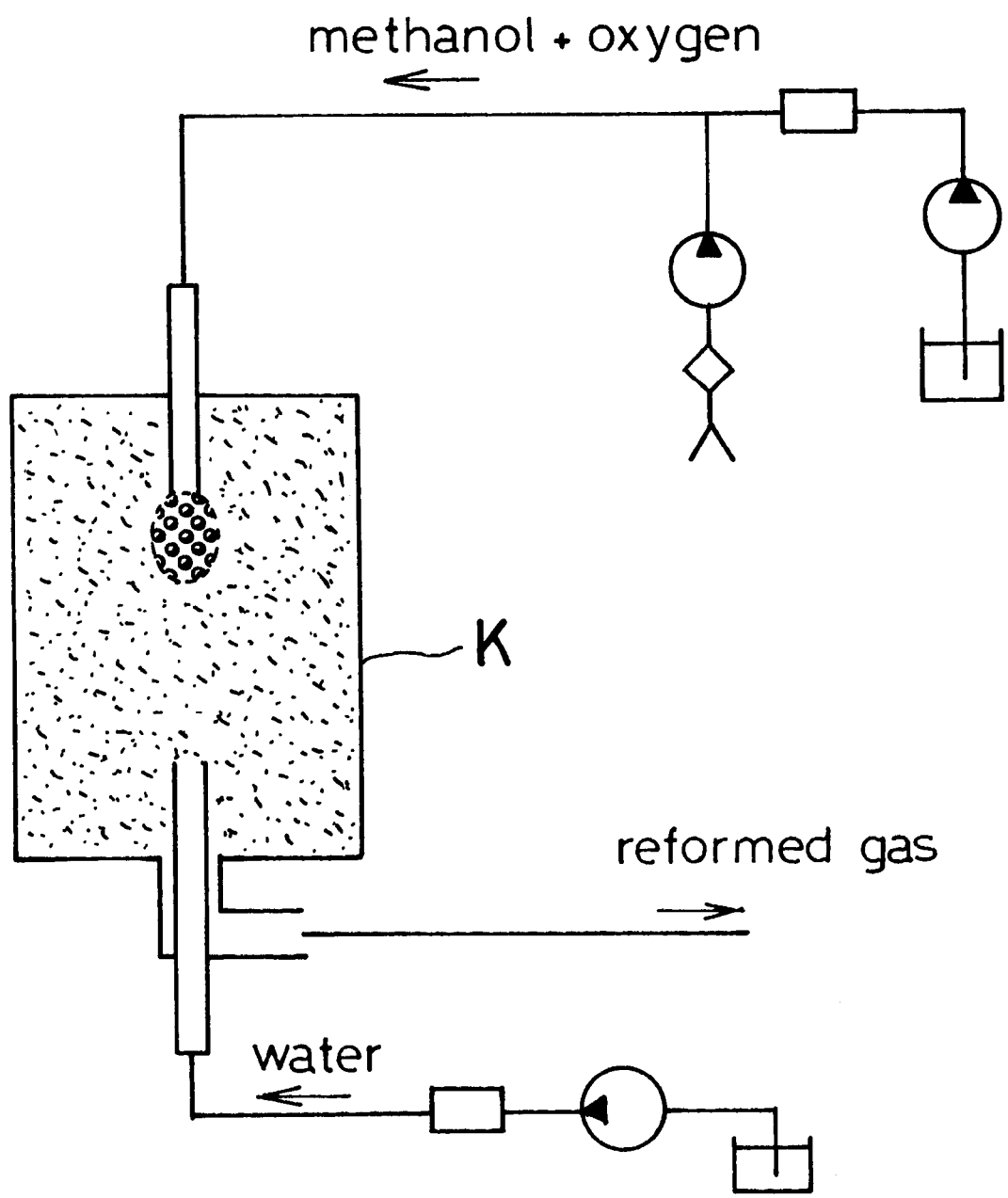
FIG. 10 is a sectional view showing a conventional hydrogen generating apparatus.

A reformer for a fuel cell of a fourth embodiment is of different from the first embodiment in that, as shown in FIGS. 8 and 9, a spherical catalytic layer 77 is disposed at the center of a hollow cylindrical container 30, and inlet and outlet spaces 78 and 79 are formed inside and outside the spherical catalytic layer 77. The container 30 is formed as a hollow cylindrical container in which an opening and an inlet 31 are formed at the center of one axial end of the container, and an opening and an outlet 32 are formed at the center of the other axial end.

The catalytic layer 77 is formed as a hollow sphere disposed in the container 30 and having a spherical inlet space 78 with a small diameter. The inlet space 78 of the catalytic layer 77 of the hollow sphere communicates with the opening of the one axial end of the container 30, end the outlet space 79 is formed between the outer wall of the catalytic layer 77 of the hollow sphere and the inner peripheral wall of the container 30. The catalytic layer 77 is made of a porous material supporting a methanol reforming catalyst, such as ceramics including alumina.

In the reformer for a fuel cell of the fourth embodiment having the above structure, the vapor of the methanol solution as the raw fuel and air are introduced from the inlet 31 into the spherical inlet space 78 with the small diameter formed inside the catalytic layer 77 of the hollow sphere. The introduced vapor of the methanol solution and air are subjected to a partial oxidation reaction as the reforming reaction in the catalytic layer 77 of the hollow sphere, and the reformed gas is discharged through the outlet space 79.

In the reformer for a fuel cell of the fourth embodiment having the above operation, since the introduced vapor of the methanol solution and air are subjected to a partial oxidation reaction as the reforming reaction by the catalytic layer 77 of the hollow sphere, the catalytic layer is effectively used, a sufficient shift reaction is made possible, the volume velocity is raised, and the pressure loss is reduced. That is, since the partial oxidation reaction is performed by the catalytic layer 77 as a hollow sphere in which the passage cross section of the catalytic layer increases from the inner peripheral side to the outer peripheral side three dimensionally, the increase of the flow velocity can be suppressed and the increase of the pressure loss can be suppressed.

If, as in the conventional apparatus, if the passage cross section of the catalytic layer is constant, the flow velocity becomes high so that the pressure loss is increased. Especially in the shift reaction in which the reaction is comparatively slow, if the flow velocity is increased in order to produce a sufficient reaction, the thickness of the catalytic layer in the passage direction must be increased, which further increases the pressure loss and more power for introducing the raw fuel becomes necessary, so that the total efficiency is lowered. This problem can be solved by the reformer of the present invention.

Moreover, in the reformer for a fuel cell of the fourth embodiment, since the catalytic layer 77 is made of a porous material supporting the methanol reforming catalyst, such as ceramics including alumina, the vapor of the methanol solution passing through the catalytic layer is uniformly reformed by the methanol reforming catalyst supported by the porous material, the number of components is reduced and the structure is made simple.

The foregoing embodiments are shown for explanation, and the present invention is not limited to those, but may be modified or may be added to with any feature, as long as the modification or addition is not inconsistent with the technical concept of the present invention recognized from the claims, the section of the detailed description of the invention, and the drawings.

In the foregoing first to third embodiments, although a granular catalyst is interposed between the wire meshes has been explained as an example, the present invention is not limited thereto, but a mode in which a catalytic layer is formed of a porous material supporting a catalyst may be adopted.

In the foregoing fourth embodiment, although the catalytic layer is formed of a porous material supporting the catalyst has been explained as an example, the present invention is not limited thereto, but a mode in which a catalytic layer is formed of a granular catalyst interposed between spherical wire meshes may be adopted.

What is claimed is:

1. A reformer for a fuel cell using a partial oxidation reaction as a reforming reaction for producing hydrogen, comprising:

a container including an inlet for introduction of a vapor of a methanol solution as a raw fuel and an outlet for discharge of a reformed gas; and a catalytic layer in said container and structured such that the inside of the container is divided into an inlet space communicating with the inlet and an outlet space communicating with the outlet, and such that a passage cross section of the catalytic layer at a side of the outlet space is larger than a passage cross section at a side of the inlet space, wherein said catalytic layer is made of a porous material supporting a hydrocarbon reforming catalyst.

2. The reformer for a fuel cell as claimed in claim 1, wherein the passage cross section of the catalytic layer at the side of the outlet space is larger by 20% to 250% than the passage cross section at the side of the inlet space.

3. The reformer for a fuel cell as claimed in claim 1, wherein the passage cross section of the catalytic layer gradually increases from the side of the inlet space to the side of the outlet space.

4. The reformer for a fuel cell as claimed in claim 1, wherein:

the container comprises a hollow cylinder having an opening at a center of one axial end of the container and an opening at a center of the other axial end of the container; and the catalytic layer includes a hollow cylinder with a smaller outer diameter and a shorter length in an axial direction than those of the container, one axial end of the catalytic layer being fixed to the one axial end of the container in which the inlet is disposed, the reformer further comprising a plate for closing the hollow of the catalytic layer at the other axial end of the container.

5. The reformer for a fuel cell as claimed in claim 1, wherein:

the container is a hollow cylindrical container having an opening at a peripheral portion of one axial end of the container and an opening at a center of the other axial end;

the catalytic layer includes a plurality of diametric parts of hollow cylinders provided side by side at equal angles on an inner peripheral wall of the container; and the inlet space is formed between the inner peripheral wall of the container and an inner peripheral wall of each of the diametric parts of the hollow cylinders, and the outlet space is formed between outer peripheral walls of the diametric parts of the hollow cylinders.

6. The reformer for a fuel cell as claimed in claim 1, wherein:

the container is a hollow truncated conical container having an inlet opening at a center of one axial end of the container and an outlet opening at a center of the other axial end of the container, an outer diameter of the container increasing gradually from the one of said axial ends to the other; and the catalytic layer is disposed in the truncated conical container between a position separate by a fixed distance from the inlet opening and a position separate by a fixed distance from the outlet opening.

7. The reformer for a fuel cell as claimed in claim 1, wherein:

the container is a hollow cylindrical container having an opening at a center of one axial end of the container and an opening at a center of the other axial end of the container;

the catalytic layer is disposed inside the container and includes a hollow sphere having an inlet space extending therein and communicating with the opening of the one axial end of the container; and the outlet space is disposed between an outer wall of the catalytic layer of the hollow sphere and an inner peripheral wall of the container.

8. The reformer for a fuel cell as recited in claim 1, wherein the catalytic layer is made of ceramics including alumina.

9. A reformer for a fuel cell using a partial oxidation reaction as a reforming reaction for producing hydrogen, comprising:

a container including an inlet for introduction of a hydrocarbon and water as a raw fuel and an outlet for discharge of a reformed gas; and a catalytic layer in said container and structured such that the inside of the container is divided into an inlet space communicating with the inlet and an outlet space communicating with the outlet, and such that a passage cross section of the catalytic layer at a side of the outlet space is larger than a passage cross section at a side of the inlet space, wherein said catalytic layer is made of a porous material supporting a hydrocarbon reforming catalyst.

* * * * *

UNITED STATES PATENT AND TRADEMARK OFFICE
CERTIFICATE OF CORRECTION

PATENT NO. : 6,284,398 B1
DATED : September 4, 2001
INVENTOR(S) : Kiryu

It is certified that error appears in the above-identified patent and that said Letters Patent is hereby corrected as shown below:

<u>Title page,</u>
Item [76] should be deleted.
Item [75], the inventor's information should read:
-- [75] Inventor: Koji Kiryu, Aichi-ken (JP) --
Item [73], the Assignees information should read:
-- [73] Assignees: Aisin Seiki Kabushiki Kaisha, Kariya-shi (JP);
Johnson Matthey Public Limited Company,
Trafalgar (GB) --
Item [74], the Attorneys information should read:
-- *Attorney, Agent, or Firm* -- Oblon, Spivak, McClelland, Maier & Neustadt, P.C. --

Signed and Sealed this

Twenty-eighth Day of May, 2002

JAMES E. ROGAN
*Director of the United States Patent and Trademark Office*

*Attest:*

*Attesting Officer*